United States Patent Office 3,586,658
Patented June 22, 1971

3,586,658
EPOXY RESINS CURED WITH ANHYDRIDE
RESIDUE
George S. Wooster, Hamburg, N.Y., assignor to Allied
Chemical Corporation, New York, N.Y.
No Drawing. Filed Feb. 10, 1969, Ser. No. 798,170
Int. Cl. C08g 30/12
U.S. Cl. 260—47EA                10 Claims

ABSTRACT OF THE DISCLOSURE

Oxirane-containing epoxy resins may be cured by reacting the epoxy resins, optionally in the presence of heat and/or a small amount of a tertiary amine catalyst, with the viscous anhydride residue obtained by the reaction of tetrapropylene with maleic anhydride after substantially complete removal of unreacted substrate and dodecenylsuccinic anhydride from the reaction mixture.

BACKGROUND OF THE INVENTION

This invention relates to a process for the curing of epoxy resins.

Typical commercially available epoxy resins are polyglycidal ethers prepared by reacting a polyhydroxy compound such as 2,2-bis-(4-hydroxyphenyl)propane with a poly-functional halohydrin for example, epichlorohydrin. Such epoxy resins contain as essential active groups 1,2-epoxy groups, i.e. oxirane groups.

These epoxy resins may be reacted with suitable hardeners or curing agents to form cross-linked polymeric materials having desirable mechanical, chemical and electrical properties required for a wide variety of applications. The available curing agents used in the preparation of these cross-linked polymeric materials are of three major types: catalytic, amine, and acid or anhydride. Of the latter type, the compound dodecenylsuccinic anhydride, hereinafter referred to as DDSAA, has been found to be a particularly useful curing agent for epoxy resins and is produced in commercial qauntities for this purpose.

DDSAA is an aliphatic anhydride prepared by the reaction of maleic anhydride and tetrapropylene, an isomeric mixture of essentially open chain aliphatic hydrocarbons having a boiling point in the range of about 170–190° C. Upon completion of the reaction, the product is typically separated from the reaction medium by distillation, leaving behind a residue which has heretofore been discarded as waste.

SUMMARY OF THE INVENTION

It has now been found that the residue obtained by substantially complete removal of unreacted substrate and dodecenylsuccinic anhydride from a tetrapropylene-maleic anhydride reaction mixture can be effectively employed as a curing agent for epoxy resins containing oxirane groups.

The anhydride resin useful in this manner is a dark, viscous liquid, usually having a viscosity within the range of about 70,000–90,000 centipoises at 25° C. and a freezing point within the range of about 0–10° C. Generally, the residue will have a neutralization equivalent (as determined by hydrolysis and potentiometric titration with sodium hydroxide) within the range of about 290–315, a specific gravity greater than 1.00 at 25 °C., and a refractive index ($n_D^{25°\ C.}$) in excess of about 1.48.

DETAILED DESCRIPTION OF THE INVENTION

According to the instant invention, epoxy resins containing oxirane groups are cured by reaction with the residue obtained in the preparation of DDSAA. The resin and anhydride residue are mixed and reacted for this purpose, most conveniently under ambient conditions, in the relative proportion of about 0.5–1.5 neutralization equivalents of the anhydride residue per equivalent of epoxy resin. More preferably, between about 0.8 and 1.0 neutralization equivalents of residue will be used per equivalent of epoxy resin.

The term "neutralization equivalent" as employed herein with respect to the anhydride residue is defined as that amount of residue which will neutralize one equivalent base, i.e., which will provide one equivalent of monovalent carboxylic acid, and is determined by hydrolysis and neutralization (titration) with a base. The anhydride residues of the instant invention normally have a neutralization equivalent within the range of about 290–315. An equivalent of epoxy resin for the purpose of this invention is that amount of resin which provides one mol of epoxy (oxirane) groups. Thus, when the anhydride residue is employed with an epoxy resin having an epoxide equivalent weight of 191, i.e., 0.525 epoxide equivalent/100 grams of resin, a ratio of 0.8 neutralization equivalent of residue per epoxide equivalent of resin indicates a ratio of about 260 grams of anhydride residue to 191 grams of the epoxy.

After the mixing of the epoxy resin and anhydride residue, the mixture may be cast to the desired shape by pouring into a suitable mold or may be employed in any of the other usual applications for epoxy resins, such as for laminating or binding material for fiber glass and the like. The curing action is hastened by heating the mixture. The times and temperatures of heating are not critical, but it is preferred to heat the mixture to between about 50° C. and 200° C. for between about 1 and 10 hours during the curing.

In the curing of epoxy resins in accordance with the present invention, a catalyst may be employed, if desired, to facilitate the cure. A small amount of tertiary amine may be added to the curing system for this purpose in accordance with conventional practice. Usually between about 0.1 and 3.0 percent by weight, based on the total weight of the epoxy resin-anhydride residue mixture, is employed. Typical tertiary amine catalysts which may be used include N,N-dimethylbenzylamine, N,N-diethylbenzylamine, triethylamine, N,N-dimethylaniline, N-methylmorpholine, N-ethylmorpholine, pyridine, imidazole and the like. N,N-dimethylbenzylamine is the preferred catalyst.

The anhydride residue useful as a curing agent in accordance with the instant invention is obtained as a residue in the preparation of dodecenylsuccinic anhydride from a tetrapropylene-maleic anhydride reaction mixture. In the usual preparation of DDSAA in this manner, an excess of tetrapropylene is employed with respect to maleic anhydride. The excess of tetrapropylene should not be so great, however, that the increase in the yield of the adduct is more than offset by the decrease in the amount of the adduct resulting from the fixed capacity of the reaction equipment; hence a molar ratio of about 1 to 2 moles, preferably 1.5 moles of the tetrapropylene per mole of the maleic anhydride is generally most advantageous. The reactants are admitted to a suitable reaction vessel equipped with thermometer, agitator and condenser, preferably in an oxygen-free atmosphere which is maintained by the flow of an inert gas such as nitrogen throughout the reaction. Vigorous agitation is employed and the contents of the reactor are heated at temperatures on the order of about 150–225° C., preferably 170–200° C. The reaction can optionally be conducted under pressure and advantageously under anhydrous or substantially anhydrous conditions for a reaction time of approximately 24 hours. The reaction mixture is then transferred to suitable distillation equipment and the unreacted tetrapropylene and maleic anhydride are removed by vacuum distillation. These unreacted components can then be cooled to about 15–20° C. whereupon the maleic anhydried solidifies and can be removed by filtration. Distillation of the reaction mixture remaining after removal of the unreacted substrates (tetrapropylene and maleic anhydride) is continued to recover a product fraction consisting substantially of dodecenylsuccinic anhydride, which is collected until a rise in pot temperature indicates that decomposition may be occurring. The remaining high boiling residue is a viscous mixture which has heretofore been discarded as waste. It is this residue which is employed as a curing agent in accordance with the instant invention.

By providing a use for material which has heretofore been discarded as waste, the instant invention has unexpectedly rendered the process for the production of dodecenylsuccinic anhydride more economical. Furthermore, hardened epoxy resins which have desirable properties, such as good heat deflection temperature, are obtained in an efficient manner.

The following examples are provided to illustrate the instant invention more fully. Many variations and modifications of the invention may be made without departing from the spirit and scope thereof. Hence, they are provided for illustrative purposes only and are not to be construed as limiting the invention, which is defined by the appended claims. In the examples, unless otherwise indicated, all parts are by weight and all temperatures are expressed in centigrade degrees.

EXAMPLE 1

Preparation of DDSAA and anhydride residue

One hundred and one parts (0.6 mol) of tetrapropylene was mixed with 39.2 parts (0.4 mol) of maleic anhydride and the mixture was heated and stirred in a nitrogen atmosphere at 170–195° for 24 hours. The reaction mixture was then transferred to a distillation flask connected to a six-inch Vigreux column and distilled at a pressure of approximately 1.1 millimeters of mercury. The first fraction of distillate was collected until a pot temperature of 157° and a head temperature of 61° at 1.1 mm. of Hg was reached. The amount of this first fraction of distillate was 58.6 grams, which upon cooling to 15° and filtering, yielded 7.3 grams of unreacted maleic anhydride and 51.3 grams of unreacted tetrapropylene. The distillation was continued with the pot temperature no greater than 161° until the head temperature reached 155° at 1.1 mm. of Hg, and a second fraction was obtained containing 73 grams of dodecenylsuccinic anhydride. After these two distillation fractions were removed, there remained 5.9 parts of a higher boiling anhydride residue, having the following properties, which are compared with those of DDSAA:

|  | Residue | DDSAA |
| --- | --- | --- |
| Color (usual) | Black | Light yellow. |
| Specific gravity at 25° C. | 1.050 | 0.990. |
| Refractive index ($n_D^{25}$) | 1.4970 | 1.4754. |
| Freezing point (±2° C.) | +5° | <−10°. |
| Neutralization equivalent [1] | 304 | 133. |
| Viscosity (cps. at 25° C.) | 78,800 | 290±10. |

[1] Determined by hydrolysis of the anhydride residue and potentiometric titration of the resulting acid with NaOH.

EXAMPLES 2–7

One hundred parts of liquid epoxy resin (Araldite 6010, a commercially available diglycidyl ether of bisphenol A) having an epoxide equivalent value of .51 to .54 equivalents per 100 grams was mixed with 139 parts of anhydride residue prepared as in Example 1. To this mixture was added 2 parts of N,N-dimethylbenzylamine catalyst.

A sample of the mixture was heated by means of an oil bath maintained at 90° and the peak exothermic temperature and gel time were observed. The first sign of gel was indicated by the occurrence of a stringy flow state and completion of gel was indicated by the transition of the sample to a soft solid state which did not flow.

Additional samples of the mixture of epoxy resin, anhydride residue and N,N-dimethylbenzylamine as described above were subjected to either of two curing cycles (Cure A or Cure B) and the heat deflection temperatures of the cured samples were determined.

For Cure A, the samples were maintained at 90° for 3 hours, then 150° for 4 hours.

For Cure B, the samples were maintained at 90° for 3 hours, then 150° for 4 hours, then 200° for 4 hours.

The heat deflection temperature of each sample was determined following ASTM–D–648–56 procedure. In the test, two ½″ x ½″ x 5″ specimens of each sample were heated at a rate of increase of two centigrade degrees per minute under 264 pounds per square inch load and the heat deflection teemperature was taken as the temperature at which a 10 mil deflection was observed.

This procedure was repeated with varying amounts of anhydride residue and substituting varying amounts of DDSAA for the residue.

The peak exothermic temperature, gel time, and heat deflection temperatures for each of the cured resins are set out below.

| Examples | 2 | 3 | 4 | 5 | 6 | 7 |
| --- | --- | --- | --- | --- | --- | --- |
| Composition (in parts): | | | | | | |
| Epoxy resin | 100 | 100 | 100 | 100 | 100 | 100 |
| Anhydride residue | 139 | 113 | 84 | | | |
| DDSAA | | | | 139 | 113 | 84 |
| N,N-dimethylbenzylamine | 2 | 2 | 2 | 2 | 2 | 2 |
| Peak exothermic temperature, degrees | 97 | 101 | 110 | 95 | 97 | 102 |
| Time at which peak temperatures occurred (in minutes) | 24 | 22 | 13 | 35 | 39 | 31 |
| Start of gel [1] (in minutes) | 24 | 18 | 13 | 42 | 31 | 20 |
| Completion of gel [1] (in minutes) | 42 | 31 | 16 | 46 | 35 | 23 |
| Heat deflection temperature (±2°): | | | | | | |
| Cure A | 73 | 76 | 74 | 75 | 68 | 54 |
| Cure B | 74 | 77 | 75 | 76 | 73 | 65 |

[1] Zero time is taken as the time when the mass reached 80°.

From the foregoing examples it will be seen that the process of the present invention not only provides an effective method of curing epoxy resins but also offers an economic advantage in the practical utilization of heretofore wasted materials.

What is claimed is:

1. A process for curing an epoxy resin containing oxirane groups which comprises reacting said epoxy resin with an anhydride residue obtained by substantially complete removal of unreacted substrate comprising tetrapropylene and maleic anhydride and of dodecenylsuccinic anhydride from a tetrapropylene-maleic anhydride reaction mixture.

2. The process of claim 1 wherein the anhydride residue is present in amounts of about 0.5 to 1.5 neutralization equivalents per equivalent of epoxy resin.

3. The process of claim 1 wherein the anhydride residue is present in amounts of about 0.8 to 1.0 neutralization equivalents per equivalent of epoxy resin.

4. The process of claim 1 wherein the reaction temperature during curing is within the range of about 50–200° C. for about 1–10 hours.

5. The process of claim 1 wherein the epoxy resin and anhydride mixture is admixed with between about 0.1 and 3.0% by weight of a tertiary amine catalyst based on the total weight of the epoxy resin and anhydride mixture.

6. The process of claim 5 wherein said tertiary amine catalyst is N,N-dimethylbenzylamine.

7. A cured epoxy resin composition comprising oxirane-containing epoxy resin cured by reaction with an anhydride residue obtained by substantially complete removal of unreacted substrate comprising tetrapropylene and maleic anhydride and of dodecenylsuccinic anhydride from a tetrapropylene-maleic anhydride reaction mixture.

8. A cured epoxy resin composition of claim 7 in which the anhydride residue is admixed with a tertiary amine catalyst in an amount between about 0.1 and 3.0% by weight of the total weight of the epoxy resin and anhydride residue mixture.

9. A cured epoxy resin compositionf claim 8 wherein said tertiary amine catalyst is N,N-dimethylbenzylamine.

10. A cured epoxy resin composition according to claim 7 wherein said oxirane-containing epoxy resin is the reaction product of 2,2-bis-(4-hydroxyphenyl)propane and a polyfunctional halohydrin.

References Cited
UNITED STATES PATENTS 2,944,035　7/1960　Wear _____ 260—46

WILLIAM H. SHORT, Primary Examiner

T. E. PERTILLA, Assistant Examiner

U.S. Cl. X.R.

161—185R; 260—78.4Ep